US012747367B2

(12) United States Patent
Tritt et al.

(10) Patent No.: US 12,747,367 B2
(45) Date of Patent: Sep. 29, 2026

(54) PAYMENT STRUCTURE WITH PCM MATERIAL

(71) Applicant: APT ASIA PACIFIC PTY. LTD., Dandenong (AU)

(72) Inventors: James Michael Tritt, Beaconsfield (AU); Robert Corbo, Cranbourne North (AU); Sumeet Luddu, Chirnside Park (AU)

(73) Assignee: Apt Asia Pacific Pty. Ltd., Victoria (AU)

( * ) Notice: Subject to any disclaimer, the term of this patent is extended or adjusted under 35 U.S.C. 154(b) by 524 days.

(21) Appl. No.: 18/348,906

(22) Filed: Jul. 7, 2023

(65) Prior Publication Data

US 2024/0368424 A1 Nov. 7, 2024

(30) Foreign Application Priority Data

May 4, 2023 (EP) .................................... 23171682

(51) Int. Cl.
*E01C 13/02* (2006.01)
*C08K 3/013* (2018.01)
(Continued)

(52) U.S. Cl.
CPC ............ *C09D 133/08* (2013.01); *C08K 3/013* (2018.01); *C08K 3/042* (2017.05); *C08K 3/36* (2013.01); *C08K 9/10* (2013.01); *C09D 5/002* (2013.01); *C09D 175/04* (2013.01); *E01C 13/02* (2013.01); *C08K 2201/001* (2013.01); *C08K 2201/005* (2013.01); *C09D 7/61* (2018.01)

(58) Field of Classification Search
CPC ......... E01C 13/02; C08K 3/013; C08K 3/042; C08K 3/36; C08K 2201/001; C08K 2201/005; C09D 5/002; C09D 7/61; C09D 133/08; C09D 175/04
USPC ................................................ 404/28–31, 75
See application file for complete search history.

(56) References Cited

U.S. PATENT DOCUMENTS 3,132,065 A * 5/1964 Barsy .................. D06N 7/0042 442/72
3,626,149 A * 12/1971 Carney .................. C04B 28/04 165/905
(Continued)

FOREIGN PATENT DOCUMENTS

CN 205604009 U 9/2016
CN 115012272 A 9/2022
(Continued)

OTHER PUBLICATIONS

Office Action for corresponding European Application No. 23171682.0 dated Oct. 27, 2023.
(Continued)

*Primary Examiner* — Raymond W Addie
(74) *Attorney, Agent, or Firm* — Harness, Dickey & Pierce, P.L.C.

(57) ABSTRACT

A floor pavement structure exhibiting resistance to overheating, the floor pavement structure comprising at least one layer containing a phase change material. The floor pavement structure may further comprise a heat conductive sub-layer including graphite, graphene or combinations thereof, the heat conductive sub-layer being disposed between the phase change material containing layer and a substrate.

18 Claims, 9 Drawing Sheets

(51) Int. Cl.

| | |
|---|---|
| ***C08K 3/04*** | (2006.01) |
| ***C08K 3/36*** | (2006.01) |
| ***C08K 9/10*** | (2006.01) |
| ***C09D 5/00*** | (2006.01) |
| ***C09D 133/08*** | (2006.01) |
| ***C09D 175/04*** | (2006.01) |
| *C09D 7/61* | (2018.01) |

(56) References Cited

U.S. PATENT DOCUMENTS

| | | | | |
|---|---|---|---|---|
| 3,986,781 | A * | 10/1976 | Condo | E02D 3/00 404/31 |
| 5,053,446 | A * | 10/1991 | Salyer | C08L 23/06 523/205 |
| 6,652,771 | B2 * | 11/2003 | Carn | C04B 30/00 62/530 |
| 6,835,334 | B2 | 12/2004 | Davis et al. | |
| 2009/0223110 | A1 | 9/2009 | Forkan et al. | |
| 2013/0199755 | A1 | 8/2013 | Sawafta et al. | |
| 2016/0208155 | A1 * | 7/2016 | Lentz | C09K 5/063 |
| 2018/0009996 | A1 * | 1/2018 | Lentz | F28D 20/023 |

FOREIGN PATENT DOCUMENTS

| | | | |
|---|---|---|---|
| CN | 121344997 | A * | 1/2026 |
| EP | 3342930 | A1 | 7/2018 |
| KR | 102149423 | B1 | 8/2020 |
| WO | WO-2019004827 | A1 | 1/2019 |

OTHER PUBLICATIONS

International Search Report and Written Opinion for PCT/EP/2024/061900 dated Jul. 24, 2024.

* cited by examiner

PAYMENT STRUCTURE WITH PCM MATERIAL

CROSS-REFERENCE TO RELATED APPLICATIONS

This application claims priority to and the benefit of European Patent Application No. 23171682.0 filed on May 4, 2023, the entire contents of each of which are incorporated herein by reference.

FIELD OF THE INVENTION

The invention relates generally to synthetic sport surfaces such as, for example, tennis courts, and, more particularly, to a multi-layer sport surface with passive temperature control.

BACKGROUND AND RELATED ART

Many outdoor sport surfaces, e.g., tennis courts, are comprised of asphalt or concrete pavement. Such surfaces can rapidly overheat during sunny and warm days.

The general concept of using a phase change material ("PCM") to cool various surfaces is known. For example, patent document WO2019004827A1 describes a system for manufacturing a floor structure which comprising a plurality of PCM panels connected to each other to form a hard floor surface. Patent publication US20092231100A1 describes a tile structure comprising a PCM component for athletic training centers. US20130199755A1 describes an infill for artificial turf comprising PCM components to reduce the heat buildup on or near the artificial turf. KR102149423B1 describes a filler for an artificial turf comprising PCM components to reduce the heat buildup on or near the artificial turf. It also discloses sandblasting layer comprising silica sand in the turf system.

Despite the above and other rather limited attempts to use PCMs for cooling sport surfaces, up to now there has not been a solution that has gained wide acceptance in the market place. Hence, further improvements are needed for providing a cooling solution for hard sport surfaces made of asphalt or concrete with satisfactory performance characteristics in varying weather conditions over an extended period of time.

SUMMARY OF THE INVENTION

The present invention relates to a floor pavement structure with passive temperature control. In accordance with the invention, a phase change material is mixed into the floor pavement structure to cool the floor pavement structure when exposed to intensive sunshine during a game. The ground serves as a heat sink such that the phase transition is reversed for another usage cycle. The phase transitions are hysteresis like.

More specifically, the present invention provides a floor pavement structure employing a PCM containing structure, and methods of forming the floor pavement structure for a sport surface as defined in the independent claims. Various embodiments of the present invention are given in the dependent claims. Embodiments of the present invention can be freely combined with each other if they are not mutually exclusive.

Embodiments of the present invention provide new, improved solutions to the above problems associated with the prior art. According to a first aspect of the present invention a floor pavement structure for a sport playing surface is provided, the floor pavement structure comprising a PCM containing top layer (hereinafter a PCM layer) over at least one sub-layer disposed between the PCM layer and a substrate.

According to a preferred embodiment of the present invention a floor pavement structure for a sport playing surface is provided, the floor pavement structure comprising at least one PCM layer, preferably at least two PCM layers.

The amount of the at least one PCM in each of the at least two PCM layers may be the same or different. The melting point of the at least one PCM in each of the at least two PCM layers may be the same or different.

The PCM structure can be applied on a hard floor sport surface such as a tennis court with the heat conductive sub-layer applied over the hard floor surface layer and the at least two PCM layers applied over the heat conductive sub-layer. The at least two PCM layers may be identical or may be different in the type and amount of the at least one PCM used. In an embodiment, a PCM layer with a higher amount of PCM may be formed above the PCM layer with a lower amount of PCM, and may be a top layer of the floor pavement structure. Higher amount of PCM as the term is used here means higher percentage by weight of PCM based of the total weight of the PCM layer.

It has been unexpectedly found that employing at least two PCM layers with different PCM amounts by weight and or melting points is advantageous because it allows a more effective utilization of the PCM and more effective cooling by absorbing the heat generated during hot sunny days. For example, use of different PCMs by type (different melting point) or amount may allow the floor surface to be tuned to have better performance depending upon the anticipated surface temperature reduction requirement. For example, for floor surfaces with darker colour, PCMs with higher melting point may be used to achieve similar cooling effect compared to floor surfaces with lighter colours.

In some embodiments, at least one sub-layer may be a heat conductive sub-layer containing a heat conductive material. The heat conductive materials may include graphite, or graphene or a combination thereof for improved heat conductivity between the substrate and the top layer. The combination of the heat conductive sub-layer and the PCM on the outermost top layer of the floor structure has been found to be particularly advantageous in preventing the surface of the pavement structure from overheating.

The PCM cooling structure operates as a reversible heat pump wherein heat from the ground can be effectively transferred through the heat conductive sub-layer to the top PCM layers.

In some embodiments, the at least one first and second PCMs are dispersed within first and second acrylic materials, respectively, the heat conductive material is dispersed within a polyurethane (PU) or acrylic resin material, and the heat conductive material comprises graphite, graphene or a combination thereof.

The at least one first and second PCMs may be the same or different, and may have a melting point from 15° C. to 45° C., preferably 25° C. to 40° C., and more preferably 25° C. to 37° C. In some embodiments, the amount of the PCM in the first PCM layer may be at least 5.0%, in particular 10 to 30%, and more in particular 10 to 25% less than the amount of the PCM in the second PCM layer.

In some embodiments, the at least one heat conductive sub-layer includes a primer layer or a filler layer or a combination thereof. The amount of the graphene or the graphite or of the combination of graphene and graphite may be from 6.0 to 24% by weight in particular from 7.0 to 17.0% by weight, and more in particular from 10.0 to 14.0% by weight based on the total weight of the heat conductive sub-layer.

The PCM may be in an amount of from 5.0 to 12.5% by weight, in particular from 6.0 to 10.0% by weight, and more in particular from 7.0 to 9.0% by weight based on a total weight of the at least one PCM layer.

The at least one top layer may have a height of 200 μm to 800 μm, in particular 400 μm to 600 μm, and more in particular 450 μm to 550 μm.

The heat conductive sub-layer has a height of 5 μm-500 μm, 50 μm-300 μm, preferably 100 μm-150 μm.

In some embodiments, the at least one first PCM and the at least one second PCM are the same PCM and are used in the same amount.

In some embodiments, the floor pavement sub-layers may comprise a gel layer, a barrier layer, and optionally a structure layer. The gel layer may be a polyurethane (PU) gel layer comprising a solid polyurethane polymer matrix and a liquid plasticizer, the liquid plasticizer being a vegetable oil or a derivative of vegetable oil or a mixture of a vegetable oil and a derivative of vegetable oil. The barrier layer may be disposed between the PU gel layer and the at least one PCM layer. The structure layer may be disposed between the at least one heat conductive sub-layer and the top layer, and the PU gel layer may be disposed between the at least one heat conductive sub-layer and the top layer.

The floor pavement structure may preferably not comprise PCM in any of the plurality of sub-layers.

The at least one first PCM and the at least one second PCM are paraffin-based materials comprising 50-65 wt % paraffin wax, and are preferably encapsulated inside microcapsules or macrocapsules, each macrocapsule containing a plurality of microcapsules, and/or the at least one first PCM and the at least one second PCM contain a PCM within a secondary supporting structure of hydrophilic silica powder that keeps the PCM solid in its macroscopic form.

The macrocapsules may have a particle size of 200 to 800 micrometers, preferably 200 to 400 micrometers, and more preferably 200 to 400 micrometers. The microcapsules may have a particle size of 15 to 30 micrometers.

In some embodiments, the heat conductive material is a nano-graphite composite with the content of nano-graphite ranging from 5.0 to 15.0% by weight, in particular 8.0 to 12.0% by weight, and more in particular 9.0 to 11.0% by weight based on the total weight of the heat conductive sub-layer PCM composition, and wherein the thermal conductivity increases gradually with the content of the nano-graphite.

Another aspect of the present invention is directed to a method of constructing a floor pavement structure, the method comprising applying a first reaction mixture comprising a heat conductive material dispersed therein on top of a substrate and letting the applied reaction mixture to form a heat conductive sub-layer, and after the formation of the heat conductive sub-layer, forming a top layer over the heat conductive sub-layer. The heat conductive material may comprise graphite, graphene or a combination thereof.

Preferably, the forming of the top layer includes forming a first PCM layer containing at least one first PCM over the heat conductive sub-layer, and after the formation of the first PCM layer, forming a second PCM layer containing at least one second PCM over the first PCM layer.

The first reaction mixture may be a PU reaction mixture and the heat conductive sub-layer may be a primer or a filler layer. The forming of the first PCM layer may include applying a first acrylic emulsion containing the at least one first PCM and letting the applied first acrylic emulsion to form the first PCM layer over the primer layer. The forming of the second PCM layer may include applying a second acrylic emulsion containing the at least one second PCM and letting the applied second acrylic emulsion to form the second PCM layer over the first PCM layer.

The at least one first and second PCMs may be the same or different and may have a melting point from a melting point from 15° C. to 45° C., preferably 25° C. to 40° C., and more preferably 25° C. to 37° C.

In some embodiments, the amount of the PCM in the first PCM layer may be at least 5.0%, in particular 10 to 30%, and more in particular 10 to 25% less than the amount of the PCM in the second PCM layer.

The method may further comprise, after the heat conductive sub-layer is formed and before forming the first PCM layer, applying a reaction mixture of a PU matrix and a liquid plasticizer on the heat conductive sub-layer and letting a PU gel layer form with the plasticizer within the PU gel layer, and after the forming of the PU gel layer is completed, applying a barrier layer on top of the PU gel layer; wherein the application of the first PCM layer is applied on the barrier layer.

Adding the polyurethane (PU) gel layer in the pavement structure may improve the shock absorption characteristics of the pavement structure.

A "PU gel" as this term is used herein refers to an elastic, jelly-like polyurethane material that comprises a liquid. It can be a dilute cross-linked system, which exhibits basically no flow when in the steady-state. By weight, a gel is mostly liquid, yet behaves like a solid due to a three-dimensional cross-linked network of PU polymer cells within the liquid. It is the cross-linking within the fluid that gives a gel its structure (hardness) and contributes to the adhesive stick (tack). Thus, a gel is a dispersion of molecules of a liquid, within a solid network of PU cells in which the solid is the continuous phase and the liquid is the discontinuous phase. The liquid used for providing the gel-like properties of the PU gel layer is a "softening agent". The gel can consist of a solid three-dimensional network that spans the volume of the whole gel layer and ensnares it through surface tension effects. This internal network structure may result from chemical bonds, i.e., may be caused by the polymerization reaction that creates the PU in an on-site PU polymerization process. According to embodiments, vegetable oils are used as "softening agents" and "plasticizers". The resulting gel is thus an oil-based gel. Both by weight and volume, the gel thus may exhibit densities similar to those of the vegetable oil used for its creation.

Polyurethanes are produced by mixing two or more liquid streams, a polyol stream (also referred to as 'B component') and the isocyanate stream (also referred herein as 'A component'). According to embodiments, the polyol stream contains catalysts, surfactants, blowing agents and so on. This mixture might also be called a 'resin' or 'resin blend' or 'reaction mixture'. The reaction mixture may further comprise chain extenders, cross linkers, surfactants, flame retardants, blowing agents, pigments, and fillers.

A "softening agent" or "softener" as used herein is a substance that is added to another substance to increase softness.

A "plasticizer" as used herein is a substance that increases the plasticity or viscosity of a material. Plasticizers for plastics are additives, most commonly phthalate esters in PVC applications giving this material improved flexibility and durability. A "vegetable oil" is a natural, plant-based oil and is preferably used as a plasticizer because it is a bio-degradable, and non-toxic material.

These and other features and advantages of the present invention will become better understood from the following detailed description of the invention in conjunction with the accompanying drawings.

BRIEF DESCRIPTION OF THE DRAWINGS

In the following, embodiments of the invention are explained in greater detail, by way of example only, making reference to the drawings in which.

DETAILED DESCRIPTION OF THE INVENTION

Figure 1:
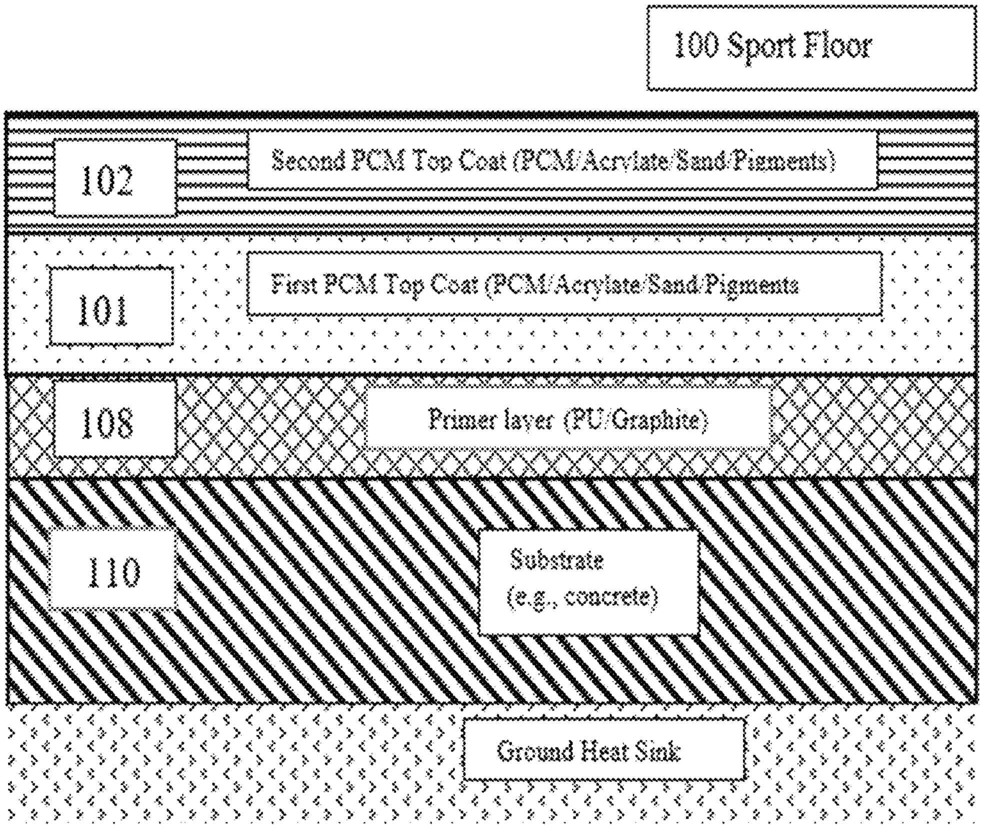
FIG. 1 illustrates a floor pavement structure according to some embodiments of the present invention comprising first and second PCM layers and a primer layer with a heat conductive material.

Referring now to FIG. 1, an example of a floor pavement structure 100 is provided according to some embodiments of the present invention. The floor pavement structure 100 comprises at least one top PCM layer 101, 102 containing at least one PCM for passive temperature control of the temperature of the floor pavement structure 100. The floor pavement structure also contains at least one heat conductive sub-layer that is adjacent to a substrate of the floor pavement structure for the effective transfer of heat to and from the ground and between the at least one top PCM layer and the ground. The PCM cooling structure can cool the floor pavement structure 100 in sunny warm days and prevent or reduce the likelihood of ice formation in cold freezing weather. In accordance with the invention, at least one PCM is mixed into the floor pavement structure 100 to cool the floor pavement structure 100 when exposed to intensive sunshine during a game. The ground serves as a heat sink such that the phase transition is reversed for another usage cycle. Thus, the floor pavement structure together with the ground functions as a reverse heat pump with hysteresis.

The floor pavement structure 100 may be, for example, a surfacing system for tennis courts, basketball courts, playgrounds, handball courts, soccer fields, and more. In some embodiments, the floor pavement structure 100 may be used as an outdoor floor pavement structure while in other embodiments it may be used as an indoor floor pavement structure 100. According to some embodiments, the floor pavement structure 100 may be used as a floor pavement structure of parks, schools, and private homes.

The floor pavement structure 100 may comprise a substrate 110, and the at least one top PCM layer disposed over the substrate 110. The at least one top PCM layer may comprise first and second PCM layers 101 and 102 (hereinafter referred to as the first and second PCM top coats or first and second PCM layers). The floor pavement structure 100 may further comprise at least one heat conductive sub-layer 108 containing a heat conductive material. The heat conductive sub-layer 108 may be a primer layer 108 containing the heat conductive material.

The substrate 110 may be a single or multilayer structure used as a floor of hard courts for various sports such as, for example, tennis, basket-ball, soccer court, and the like built on concrete or asphalt. For example, the substrate 110 may be a concrete substrate. A concrete substrate as this term is used herein includes concrete and concrete-based substrates comprising concrete mixtures or concrete composite materials comprising concrete and one or more additional materials used in hard floors of sport courts.

As another example, the substrate 110 may be an asphalt substrate. An asphalt substrate as this term is used herein includes asphalt and asphalt-based substrates comprising asphalt mixtures or asphalt composite materials comprising asphalt and one or more additional materials used in hard floors of sport courts.

Figure 4:
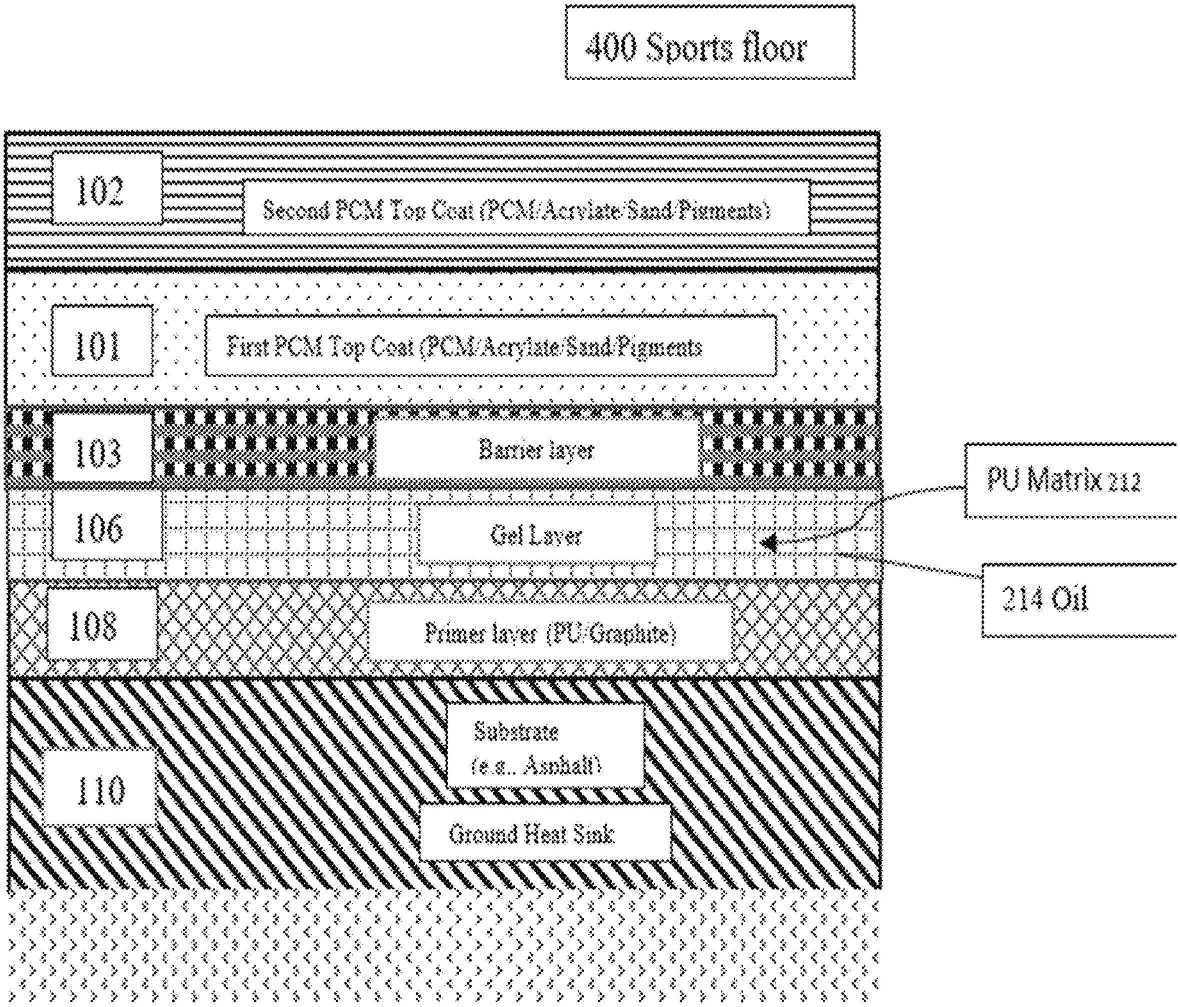
FIG. 4 illustrates another floor pavement structure according to some embodiments of the present invention comprising first and second PCM layers, a primer layer with a heat conductive material, and a polyurethane (PU) gel layer.
Figure 5:
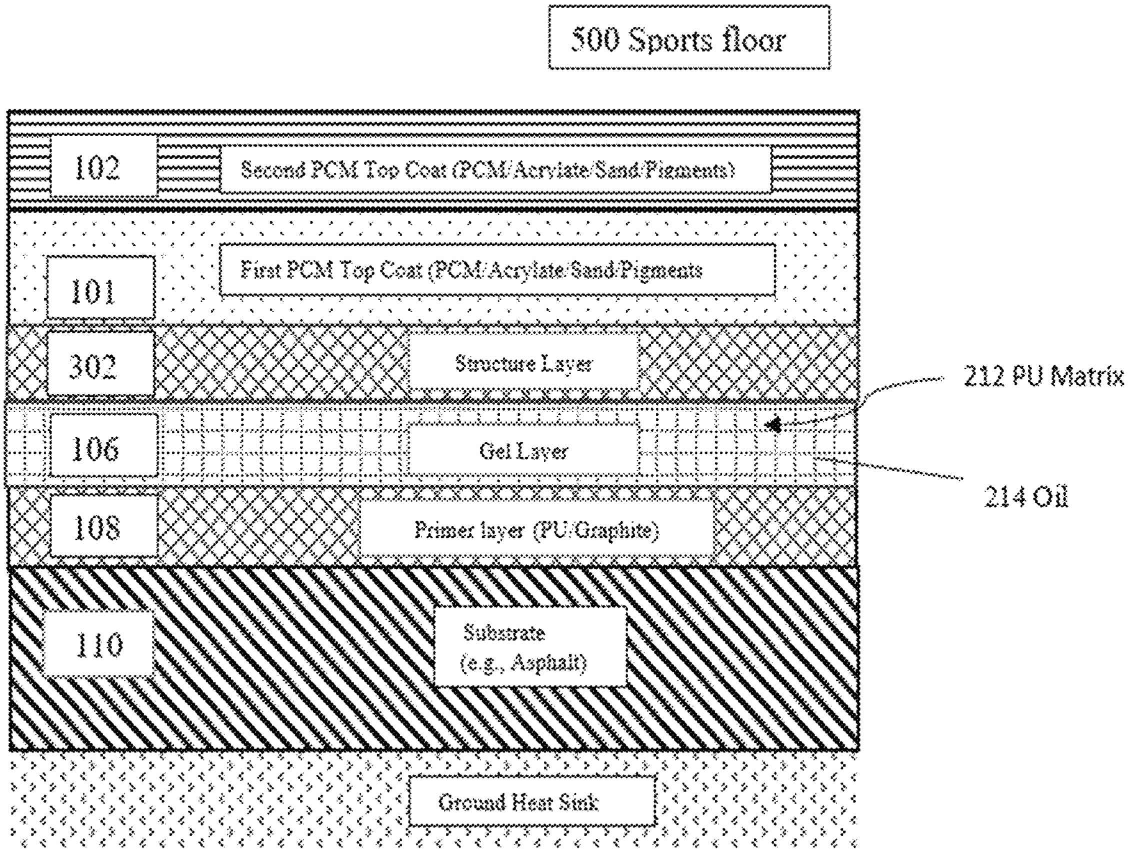
FIG. 5 illustrates another floor pavement structure according to some embodiments of the present invention comprising first and second PCM layers, a primer layer with a heat conductive material, a polyurethane (PU) gel layer, a barrier layer, and a structure layer.
Figure 6:
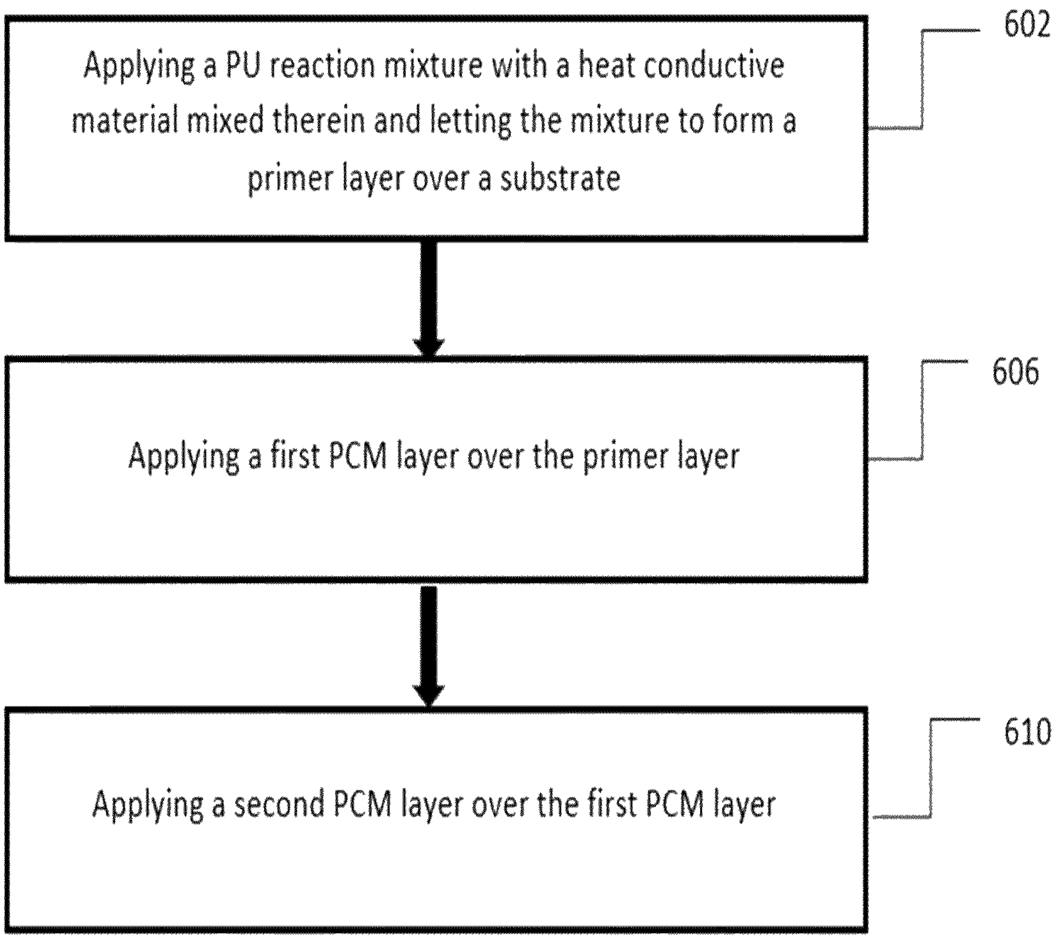
FIGS. 6-9 are simplified flow charts of methods for making the floor pavement structures according to embodiments of the present invention.

The first and second PCM layers 101, 102 may be applied as the top layers of the floor pavement structure and may serve to control the floor pavement structure temperature and for sealing the floor pavement structure to prevent rain from penetrating inside the floor pavement structure. In some embodiments, the at least one top PCM layer may also serve as a cushioning and/or coloring coating. Any suitable cushioning and/or coloring materials may be used. In some embodiments, a separate cushioning layer (also referred to as a shock absorption layer) may be applied between the top PCM layer and the substrate 110 for providing added cushioning to the floor pavement structure. An example of such structure is shown in FIGS. 4 to 6.

The first and second PCM layers 101, 102 may each comprise at least one PCM, preferably at least two PCMs, and most preferably at least three PCMs. When at least two PCMs or at least three PCMs are used, the PCMs may be selected to have different melting points within a desired range in order to provide improved temperature control of the floor pavement structure.

The first and second PCM layers 101, 102 may each comprise from 4.0 to 10.0% by weight, in particular from 5.0 to 9.0% by weight, and more in particular from 6.0 to 8.0% by weight based on a total weight of each PCM layer on a wet basis. On a dry basis. i.e., after application and drying of the water, the first and second PCM layers 101, 102 may each comprise from 5.0 to 12.5% by weight, in particular from 6.0 to 10.0% by weight, and more in particular from 7.0 to 9.0% by weight based on a total weight of each PCM layer.

In some embodiments, the PCM in each of the first and second PCM layers 101 and 102 may be from 6.5 to 7.5% by weight based on the total weight of each PCM layer on a wet basis, or from 7.5 to 8.5% by weight on a dry basis.

Each of the first and second PCM layers 101, 102 may be an acrylic latex layer, a styrolbutadiene (also known as styrenebutadiene) layer or a layer that is based on a combination of acrylic latex and carboxylated styrolbutadiene. Each of the first and second PCM layers 101, 102 may comprise a significant portion (e.g., more than 40% or even more than 60% of its weight) of filling materials such as sand and/or chalk which improve the surface roughness and the grip.

The first and second PCM layers may each have a height (also referred to as thickness) of 100 μm to 400 μm, in particular 200 μm to 300 μm, and more in particular 225 μm to 275 μm. In some embodiments the first and second PCM layers may each have a height of 250 μm. Hence, when two PCM layers are used the total height of the PCM layers combined may be 200 μm to 800 μm, in particular 400 μm to 600 μm, and more in particular 450 μm to 550 μm.

The first and second PCM layers 101 and 102 may comprise the same PCM but in different amounts with the amount of the PCM in the second PCM layer 102 being higher (or greater) than the amount of the PCM in the first PCM layer 101. For example, the amount of the PCM in the first PCM layer 101 may be at least 5.0%, in particular 10 to 30%, and more in particular 10 to 25% less than the amount of the PCM in the second PCM layer 102. The amount of the PCM in the first PCM layer 101 refers to the weight of the PCM over the weight of the total material of the first PCM layer 101. The amount of the PCM in the second PCM layer 102 refers to the weight of the PCM over the weight of the total material of the second PCM layer 102.

Decreasing the PCM content from a higher amount at the outermost second PCM layer 102 towards the innermost layer of the first PCM layer 101 may improve utilization of the PCM employed for removing heat when the temperature rises at the melting point of the PCM while keeping the temperature of the floor pavement structure 100 from rising above a desired temperature range. It may be also advantageous in returning the PCM back to its solid phase when the temperature drops, thus releasing heat to maintain the temperature of the floor pavement structure 100 from dropping significantly. Thus, this configuration with the PCM gradient between the two layers may be advantageous for controlling the temperature of hard floor pavement structures for sport courts within a desirable temperature range.

In some embodiments, the first and second PCM layers 101 and 102 may include a first PCM and a second PCM respectively, wherein said first and second PCMs may be different and may have different melting points. For example, the first PCM and second PCM or PCMs may be selected to have different melting points. The first PCM in the first PCM layer 101 may have the lower melting point. The amount of the first and second PCM in each layer may differ. For example, the first PCM layer 101 may have a lower amount of the first PCM than the amount of the second PCM in the second PCM layer 102. For example, the amount of the first PCM layer in the first PCM layer 101 may be at least 5.0% by less, in particular 10 to 30%, and more in particular 10 to 25% less than the amount of the second PCM in the second PCM layer 102.

In some embodiments, the first and second PCM layers 101, 102 may each comprise two PCMs, and the total amount of the two PCMs in each layer may be different, with the total amount of the two PCMs being less in the first PCM layer 101 than in the second PCM layer 102.

In some embodiments, the first and second PCM layers 101, 102 may each comprise three PCMs, and the total amount of the three PCMs in each layer may be different, with the total amount of the three PCMs being less in the first PCM layer 101 than in the second PCM layer 12.

According to some embodiments, the PCM layers may be acrylic emulsions comprising besides the PCM, pigments and sand. This may be advantageous as the sand gives the surface of the material the rough feel and touch of a sandy court, e.g., a tennis court, whereby the sand grains are firmly fixed in the hardened acrylic emulsion of the PCM layers. Using multiple layers of the PCM layers may increase the amount of PCM and sand added to the pavement structure and, thus, may increase the cooling characteristic and the surface roughness, grip and robustness of the pavement structure. It may also allow varying the type of PCMs and their melting points in each layer which may further improve temperature control of the floor pavement structure.

The primer layer 108 may be a heat conductive sub-layer comprising a heat conductive material. The heat conductive material may preferably be graphite, graphene or a combination thereof. In some embodiments, the graphite may be nano-graphite. The primer layer 108 may be disposed between the first PCM layer 101 and the substrate 110. The primer layer 108 may also be adapted for improving adhesion of the multilayer PCM cooling structure to the substrate. The PCM cooling structure refers to the PCM layers plus any sub-layer including the heat conductive sub-layer disposed between the substrate and the PCM layers.

The amount of the graphene or the graphite or of the combination of graphene and graphite in the primer layer 108 may be from 4.0 to 20% by weight, in particular from 6.0 to 14.0% by weight, and more in particular from 8.0 to 12.0% by weight based on the total weight of the heat conductive sub-layer on a wet basis. On a dry basis, the amount of the graphene or the graphite or of the combination of graphene and graphite in the primer layer 108 may be from 6.0 to 24% by weight, in particular from 7.0 to 17.0% by weight, and more in particular from 10.0 to 14.0% by weight based on the total weight of the filler layer.

In some embodiments, the graphene or graphite or the combination of graphene and graphite in the primer layer 108 may be from 11.0 to 12.0% by weight based on the total weight of the primer layer 108 on a dry basis. In some embodiments, the heat conductive material may comprise nano-graphite. It has been observed that the thermal conductivity of the primer layer 108 increases gradually with the content of the nano-graphite.

According to embodiments, the primer layer is a layer of at least one coat of synthetic resin with the heat conductive material mixed therein.

According to some embodiments, the primer layer may be a polyurethane layer with the heat conductive material dispersed homogeneously therein and may be basically free of plasticizer.

In some embodiments, the synthetic resin may be an acrylic resin or an epoxy resin polymer.

In some embodiments the primer layer may be a tacky acrylic emulsion with the heat conductive material dispersed homogeneously therein. In the embodiments of FIGS. 4-6 where the PCM cooling structure also comprises a PU gel layer 106, the primary layer 108 is preferably free of compatibilizer. However, for those embodiments where the PU gel layer 106 is not used, the primer layer may include a compatibilizer for improving the adhesion between the primer layer 108 and the first PCM layer 101. The compatibilizer may be, for example, ethylene glycol which promotes adhesion between acrylate and PU. The ethylene glycol may be optionally comprised in the primer layer in an amount of at least 0.5%, preferentially about 1% by weight of the primer layer on a dry basis.

Preferably the A and B components of the primer layer PU are chosen such that the PU is a non-foamed PU that can be sprayed or painted on the substrate 110. The primer layer 108 may improve the adhesion of the PCM structure to the substrate 110.

In the primer layer 108 the graphene and/or graphite may be homogeneously mixed with the main material, e.g., the acrylic primer material. The primer layer 108 improves heat transfer between the PCM layers 101 and 102 and the substrate 110. The primer layer 108 may also seal and fill in any cracks of the substrate.

Referring again to FIG. 1, in another embodiment, the primer layer 108 and the substrate may be as discussed above, but each of the first and second PCM layers 101 and 102 may each have three PCMs with staggered melting points selected to keep the floor surface within a desirable temperature. For example, the three PCMS may be selected to have staggered melting points ranging from 15° C. to 45° C., preferably 25° C. to 40° C., and more preferably 25° C. to 37° C. The first, second, and third PCMs may be used in the same or different amounts.

The amount of the total PCM, i.e., all three PCMs, in each of the first and second PCM layers may be from 4.0 to 10.0% by weight, in particular from 5.0 to 9.0% by weight, and more in particular from 6.0 to 8.0% by weight based on the total weight of each PCM layer on a wet basis. On a dry basis, i.e., after application and drying of the water, the amount of the total PCM, i.e., all three PCMs, in each of the first and second PCM layers 101, 102 may be from 5.0 to 12.5% by weight, in particular from 6.0 to 10.0% by weight, and more in particular from 7.0 to 9.0% by weight based on a total weight of each PCM layer. In some embodiments, the total amount of the three PCMs in each of the first and second PCM layers 101 and 102 may be from 6.5 to 7.5% by weight based on the total weight of each PCM layer on a wet basis, or from 7.5 to 8.5% by weight on a dry basis.

Figure 2:
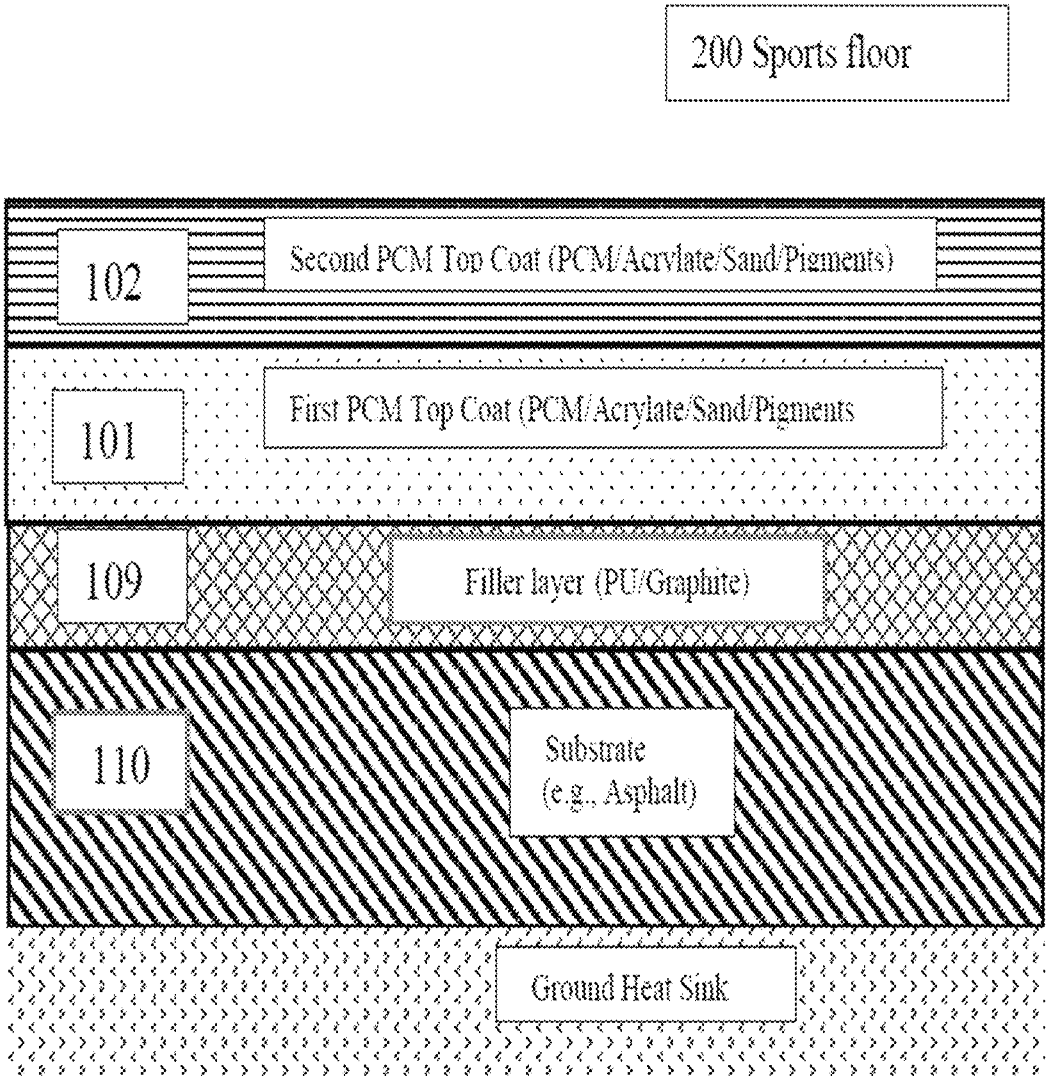
FIG. 2 illustrates another floor pavement structure according to some embodiments of the present invention comprising first and second PCM layers and a filler layer with a heat conductive material.

Referring now to FIG. 2, a floor pavement structure 200 is provided that is similar to the floor pavement structure 100 of FIG. 1 except that the primer layer 108 is replaced with a filler layer 109. The filler layer 109 may also include the heat conductive material. The amount of the graphene or the graphite or of the combination of graphene and graphite in the filler layer 109 may be from 4.0 to 20% by weight in particular from 6.0 to 14.0% by weight, and more in particular from 8.0 to 12.0% by weight based on the total weight of the filler layer on a wet basis. On a dry basis, the amount of the graphene or the graphite or of the combination of graphene and graphite in the filler layer 109 may be from 6.0 to 24% by weight in particular from 7.0 to 17.0% by weight, and more in particular from 10.0 to 14.0% by weight based on the total weight of the filler layer. Generally, the filler layer 109 may be adapted to fill gaps in the substrate 110 and may thus be sufficiently fluid in ambient temperature to allow it to pass within any gaps or pores of the substrate 110. The filler may for example, comprise any suitable acrylic-based filler or an epoxy-based filler. Hence, the filler layer is used to smooth out rough substrates. An example of a rough substrate is aged asphalt which has lost a portion of the aggregate. In some embodiments, the filler may be comprised of an acrylic or SBR latex, mineral fillers, rheology modifiers, pigment, water.

Figure 3:
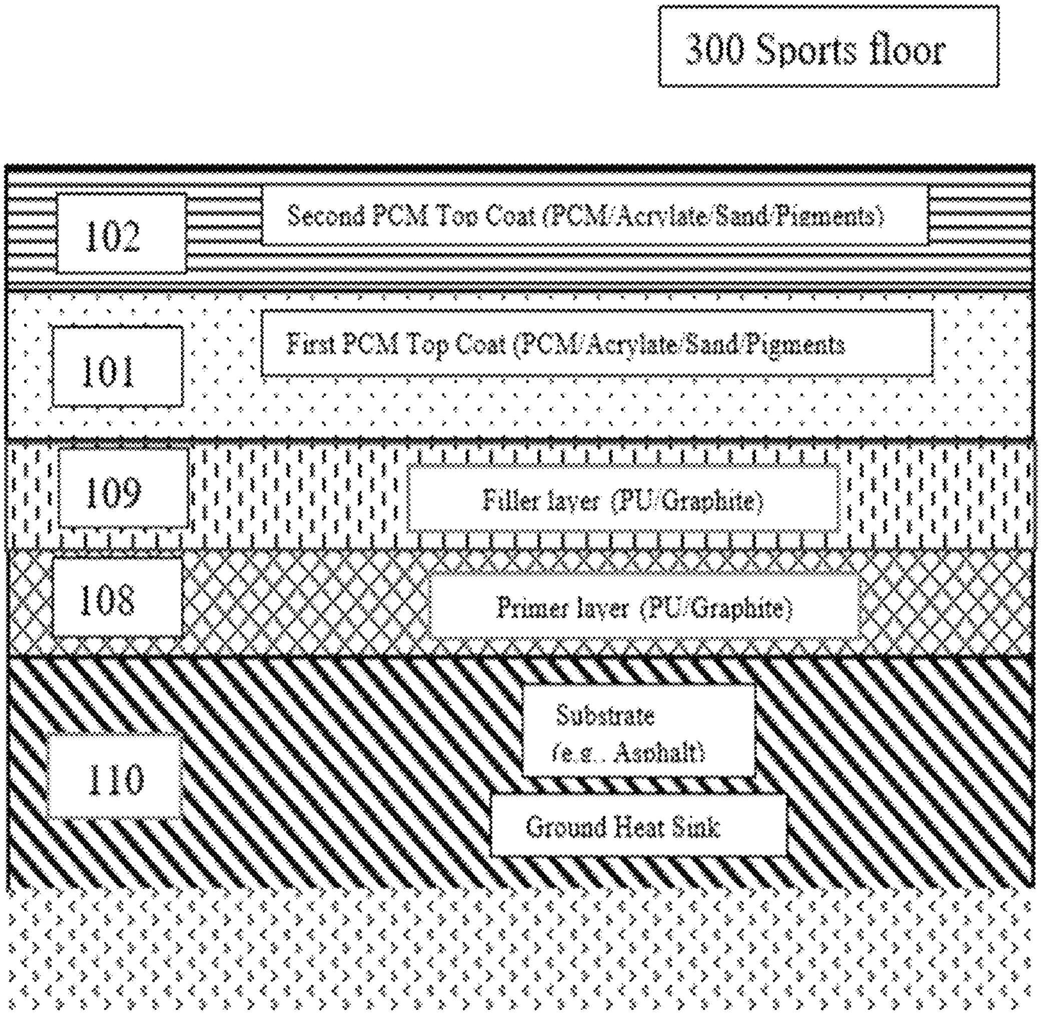
FIG. 3 illustrates another floor pavement structure according to some embodiments of the present invention comprising first and second PCM layers, a primer layer and a filler layer with a heat conductive material.

Referring now to FIG. 3, a floor pavement structure 300 is provided according to another embodiment of the present invention. The floor pavement structure 200 may have the same structure and employ the same materials for the first and second PCM layers and the substrate 110, however, it comprises both a primer 108 and a filler layer 109 both including the heat conductive material as described above for the embodiments of FIGS. 1 and 2.

The filler layer 109 may also include the heat conductive material in an amount that is the same as in the primer layer 108. The filler may also comprise, for example, of an acrylic or SBR latex, mineral fillers, rheology modifiers, pigment, and water.

Referring now to FIG. 4, a floor pavement structure 400 is provided which in addition to the layers of FIG. 1 includes a PU gel layer 106 disposed between the first PCM layer 101 and the primer layer 108. The PU gel layer 106 comprises a solid polyurethane polymer (PU) matrix 212 and a liquid component that is a plasticizer 214. This may have the advantage that a high shock absorption rate of 20% and more can be achieved. Thus, very good balance of physical properties needed for the performance of a shock absorbing pavement, e.g., sports surfaces, may be achieved over a wide range of temperatures and a wide range of substrate materials. High shock absorption rates are required for many types of sports grounds, in particular tennis courts and running tracks.

According to embodiments, the plasticizer may be a triglyceride or may comprise of one or more triglycerides by more than 50% of its weight. The triglyceride may be a mixture of multiple different triglycerides. The triglycerides may comprise, for example, stearin derived from stearic acid, palmitin derived from palmitic acid, linseed oil (rich in di- and tri-unsaturated fatty acid components) and others.

According to embodiments, the triglyceride is selected from a group comprising tristearate, tripalmitate, trioleate, trilinoleate, triricinoleate or a mixture of two or more of the foregoing. A triglyceride (TG, triacylglycerol, TAG, or triacylglyceride) is an ester derived from glycerol and three fatty acids (tri-+glyceride). The vegetable oil used as the plasticizer may consist of one or more triglycerides or may comprise one or more triglycerides as major component. In triglycerides, the hydroxyl groups of the glycerol join the carboxyl groups of the fatty acids to form ester bonds.

The 17 triglycerides may be unsaturated triglycerides, e.g., unsaturated or polyunsaturated triglycerides derived e.g., from linoleic acid). Saturated fats are "saturated" with hydrogen, i.e., all available places where hydrogen atoms could be bonded to carbon atoms are occupied. Unsaturated fats have double bonds between some of the carbon atoms, reducing the number of places where hydrogen atoms can bond to carbon atoms. Using unsaturated triglycerides may be advantageous as these triglycerides have a lower melting point and are more likely to be liquid at low temperatures.

According to embodiments, the plasticizer may be a vegetable oil or a mixture of multiple different vegetable oils.

According to the embodiment of FIG. 4, the floor pavement structure 400 may further comprise a barrier layer 103 between the PU gel layer 106 and the first PCM layer 101 for preventing the plasticizer of the PU gel layer from leaving the PU gel layer 106 into the first PCM layer 101.

Using a barrier layer 103 may be advantageous as the life expectancy of the pavement structure may be increased. The barrier layer 103 may prevent the plasticizer from leaving the gel layer and thus prevent the gel layer from becoming brittle and less elastic. Thus, the shock absorbing properties of the gel layer may be maintained over many years also under extreme conditions like extreme low temperatures in winter and direct sunlight and high temperatures in summer.

For example, the barrier layer 103 may be a layer of synthetic resin and may comprise an amount of more than 40% of a water-based acrylic at the moment of applying the layer onto the PU gel layer 106. When the water has evaporated from the barrier layer 103, the acrylic fraction of the barrier layer may exceed 80% by weight of the barrier layer 103. The synthetic resin may be preferentially selected from a group comprising acrylic latex, styrolbutadiene and combination of acrylic latex and carboxylated styrolbutadiene. The barrier layer 103 may also comprise ethylene glycol as a compatibilizer adapted to promote adhesion of the top layer to the gel layer.

According to some embodiments, the substances used for generating the pavement structure are provided in the form of a sports surfacing system that can be customized to different temperature ranges, different appearance, and different use case scenarios. For example, the top layer may be an acrylic emulsion consisting besides the PCM, sand, pigments and optionally PU polymers that can be blended into a highly concentrated form that is highly wear resistant.

According to embodiments, the pavement structure comprises only one or more coatings of the primer layer, the gel layer, the barrier layer and one or more coatings of the top layer. In addition, or alternatively, the pavement structure is basically free of any air-filled foams or air-filled layers comprising elastic granules (e.g., rubber granules). This may be advantageous as it has been observed that pavement structures comprising an air-filled layer with elastic granules may be more susceptible to wear and tear by mechanical stress than pavement structures comprising only a gel layer as elastic element. As a given volume of air (e.g., in a PU polymer bubble or in the inter-granule space of a rubber granule layer) is compressed much stronger by a given pressure than a liquid, e.g., oil, the mechanical deformation of the PU foam and of any layer contacting the air-filled PU foam layer may be much higher in case the elastic layer comprises air rather than oil. This may result in an increased wear and tear of pavement structures comprising an air-filled elastic layer rather than oil-filled elastic layer.

The generated pavement structure is a resilient, multi-layered structure with passive temperature control designed to give added comfort, and cushioning and comfortable surface temperature even in very hot sunny days for an enjoyable playing experience.

According to some embodiments (not shown), the pavement structure may comprise EPDM (ethylene-propylene-diene) rubber particles application designed to increase shock-absorbing properties of the structure. Preferentially, the EPDM rubber particles may be embedded in a top layer that consists of non-foamed polyurethane that is directly applied onto the gel layer.

Before the surfacing system is applied the base material, e.g., concrete or asphalt, needs to be prepared properly, e.g., may be cleaned from dust and moisture. Asphalt and concrete substrates may be allowed to cure a minimum of 30 days before application of any coatings. The primer may be applied to 5-day old concrete substrates. The substrate may then be cleaned and dried before the different layers are applied. The surface of the substrate is inspected to ensure that is substantially free of grease, oil, dust, dirt, and other foreign matter before any coatings are applied.

Preferentially, the surface and air temperatures should be at least 10° C. and rising for applying the individual layers. Once the surface has been thoroughly cleaned and is free of all loose material, dirt, or dust, the court is flooded and allowed to drain a minimum of 30 minutes and a maximum of 1 hour. Any area that holds water in depth greater than 1/15 inch shall be outlined and patched with the primer.

According to embodiments, the primer is mixed by pouring the "B" component into the "A" component (B and A components refer to the isocyanate and polyol components of a PU reaction mixture) and mixing using a low-speed jiffy mixer (400 to 600 rpm) for 2 minutes. At the same time of adding the A and B components of the PU reaction mixture, the heat conductive material (e.g., graphite, or graphene, or a combination thereof is added while mixing. The heat conductive materials could be added on site or factory blended prior to dispatch. The mixed primer with the heat conductive material is applied on the substrate using, for example, a medium nap roller to achieve a total coverage of approximately 0.030 gal/yd$^2$ (0.15 kg/m$^2$-300 ft$^2$/gal).

Optionally, 40 to 60 mesh silica sand is applied onto the wet primer at the rate of 5 pounds per 100 sq. ft. (0.24 kg/m$^2$) to create a rough texture. Allow 5 to 6 hours drying time before proceeding with applying additional layers on top of the primer layer.

According to the embodiment of FIG. 4, for forming the PU gel layer, a polyurethane reaction mixture comprising a liquid plasticizer is applied on the primer layer 108 in one or more lanes using a vehicle. The polyurethane reaction mixture can be applied directly on top of primer layer that has been applied previously to seal the ground and, also, improve heat conductivity to and from the ground.

In case multiple lanes of the gel layer are applied, the lanes are arranged adjacent to each other and a side edge of a first lane is in contact with a side edge of an adjacent second lane of the reaction mixture that generates a PU polymer matrix soaked with the plasticizer as the PU gel layer.

According to embodiments, the PU reaction mixture that is applied on top of the primer layer is generated in a method comprising providing polyurethane reactive components and the plasticizer. The reactive components comprise an isocyanate component and a polyol component. Then the method may further comprise:

- mixing the polyurethane reactive components, wherein the reactive components and/or the composition of the plasticizer can be chosen in dependence on environmental parameters, e.g., the typical temperature range at the installation site, and
- mixing the isocyanate component and the polyol component and the liquid plasticizer. For example, a mixing unit of the vehicle can be used for the mixing step applying one or more lanes of the reaction mixture comprising the plasticizer to a ground using an application unit connected to the mixing unit.

The barrier layer 103 may have a height of 5 μm-300 μm, preferably a height of 20 μm-200 μm, more preferably a height of 50 μm-100 μm. This may be advantageous as this layer thickness may successfully prevent the oil in the gel layer from evaporating and leaving the surface structure in direction of the top layer.

The PU gel layer 106 may have a height of 1 mm-4 mm, preferably a height of 1.5 mm-3.5 mm, more preferably a height of about 2 mm. This may be advantageous as this layer thickness may be sufficient to provide a shock absorption effect required for many types of sports grounds, e.g., a tennis court.

The primer layer 108 may have a height of 5 μm-500 μm, preferably a height of 50 μm-300 μm, more preferably a height of 100 μm-150 μm, more preferably a height of 50 μm-100 μm.

In the embodiment of FIG. 5 a floor pavement structure 500 is shown which is a variation of the pavement structure of the embodiment of FIG. 4 with the pavement structure 500 further comprising layer 302 referred herein as "structure layer". The structure layer 302 preferentially has a thickness of 100 mm-2500 mm, 400 mm-1500 mm, 800 mm to 1200 mm, e.g., 1000 mm. The structure layer is located between the gel layer and the top PCM layers 101, 102. However, in another embodiment, (not shown) the structure layer 302 may be provided between the gel layer and the barrier layer, if any. The structure layer is a further polyurethane layer. Preferably, the polyurethane in the structure layer is a none-foamed or moderately foamed PU layer. For example, the PU of the structure layer can have a density of about 1.0 to 1.1 g/cm$^3$. The structure layer may improve the structural stability of the pavement structure by ensuring that any mechanical pressure is distributed evenly on the gel layer 106. Thus, the structure layer may prevent the gel layer 106 from being damaged by a high mechanical pressure applied to a single small spot.

Although the illustrated embodiments of FIGS. 1 to 5 illustrate only two PCM layers, in some embodiments more than two PCM layers may be employed without departing from the scope of the present invention. Employing multiple PCM layers may allow a more gradual reduction of the amount of PCM in a direction from the outermost PCM layer to the innermost PCM layer, thus further improving the overall utilization and effectiveness of the PCM or PCMs employed for keeping the floor pavement structure within a desired temperature range even in extreme sunny/warm weather or freezing weather.

The disclosed PCM structures are particularly suitable for hard floor courts using concrete, asphalt, composites of asphalt, or composites of concrete substrates 110, however, their application may not be limited to only such hard floor courts and may be used in other types of floors for maintaining the floor surface within a desired temperature range.

Suitable PCMs may be enclosed inside microcapsules having walls made from polymer resins. For example, the walls of the microcapsules may be made of melamine resin, or urea resin, or modified urea resin or any combinations thereof. Examples of suitable PCMs include paraffin based PCMs. For example, the PCMs may comprise 50-65% by weight paraffin wax, and water 20-30% by weight on a wet basis with the remainder being the resin forming the walls of the microcapsules and the macrocapsules. On a dry basis the water content may be closer to about 3% by weight. By changing the particular type of the paraffin wax the melting point of the PCMs may be modified. The paraffin based PCMs may be encapsulated within a polymeric wall made from polymer resins such as, for example, melamine resin and modified urea resin. For example, for the encapsulated PCM the amount of the melamine resin may be 5 to 15% by weight and of the modified urea resin may be 0-10% by weight based on the total weight of the PCM.

In some embodiments, the PCM may be formulated within a secondary supporting structure of hydrophilic silica powder that keeps the PCM as a solid in its macroscopic form. When the PCM structure gets exposed to heat during a hot day the PCM bound to the secondary silica supporting structure melts, thus storing large amounts of heat and keeping the floor surface cool. In the night time, or when the ambient temperature falls, the PCM congeals thus releasing the latent heat associated with the phase change process.

In the illustrated floor pavement structures, the first and second PCM layers 101 and 102 are formed to be the top layers of the floor pavement structures. It has been found that adding a PCM in the sub-layers does not further substantially improve the cooling of the pavement structure.

In some embodiments, at least one of the first and the second PCM layers may further include a cushioning or shock absorption material that is mixed together with the PCM to form the at least one of the first and the second PCM layers.

A pigment may also be added in the outermost PCM layer. For example, referring to FIG. 1 a cushioning material may be mixed with the PCM or PCMs employed in the first PCM layer 101 and a coloring material may be mixed together with the PCM or PCMs employed in the second PCM layer 102. In yet another example, a cushioning material and a coloring material may be mixed together with the PCM or PCMs to form the second PCM layer 102.

Referring now to FIG. 6 a flow chart of a method for constructing a floor pavement structure 100 is provided as depicted, for example, in FIG. 1. In a first step 602, a person or a machine applies a PU reaction mixture with the heat conductive material mixed therein on top of a substrate 110, e.g., a concrete or an asphalt floor to form the primer layer 108. For example, the PU reaction mixture may comprise graphite, or graphene or a combination of the two in an amount of, for example, 10% by weight dispersed in the PU reaction mixture. The primer layer 108 is left to dry for a few hours (e.g., 5 hrs) before applying the next layer on top of the primer layer 108.

After the formation of the primer layer 108, a first PCM layer 101 is applied in step 606 on top of the primer layer 108 and is allowed to form and dry. After the first PCM layer 101 has formed and dried, in step 610 a second PCM layer 102 is applied on top of the first PCM layer. The first and second PCM layers function to cool the floor pavement structure and, also, to seal the floor pavement structure 100, thereby preventing rain from penetrating the floor pavement structure 100. The first and second PCM top layers may be acrylic emulsions comprising the at least one PCM, at least one pigment, sand, and optionally PU polymers. The sand gives the surface of the material the rough feel and touch of a sandy court, e.g., a tennis court, whereby the sand grains are firmly fixed in the hardened acrylic emulsion of the top layer.

By applying at least two PCM top layers may increase the amount of PCM added and improve the cooling effect of the PCM. Also, different amounts of PCM may be used in each of the top layers, thus improving the overall cooling effect of the PCM. Also, more sand may be added to the pavement structure and may increase the surface roughness, grip and robustness of the pavement structure.

Figure 7:
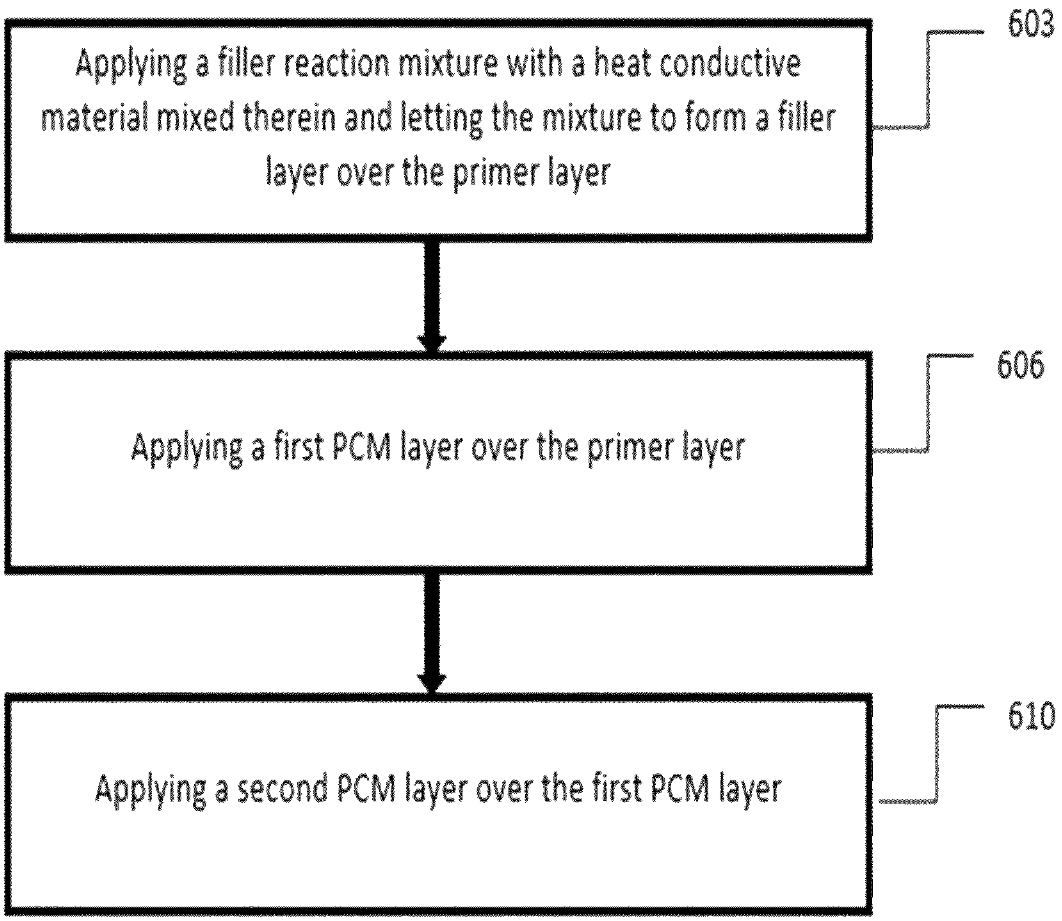

Referring to FIG. 7, a variation of the method of FIG. 6 for making the floor pavement structure 200 of FIG. 2 is illustrated. In this embodiment, in step 603 a filler mixture may be applied on the substrate 110 directly without forming a primer layer. For asphalt substrates the filler layer may be applied directly on the asphalt substrate. The filler mixture may include a heat conductive material in an amount of 10% by weight. Once the filler layer 109 is formed then steps 606 and 610 may be repeated sequentially for forming the top PCM layers 101 and 102.

Figure 8:
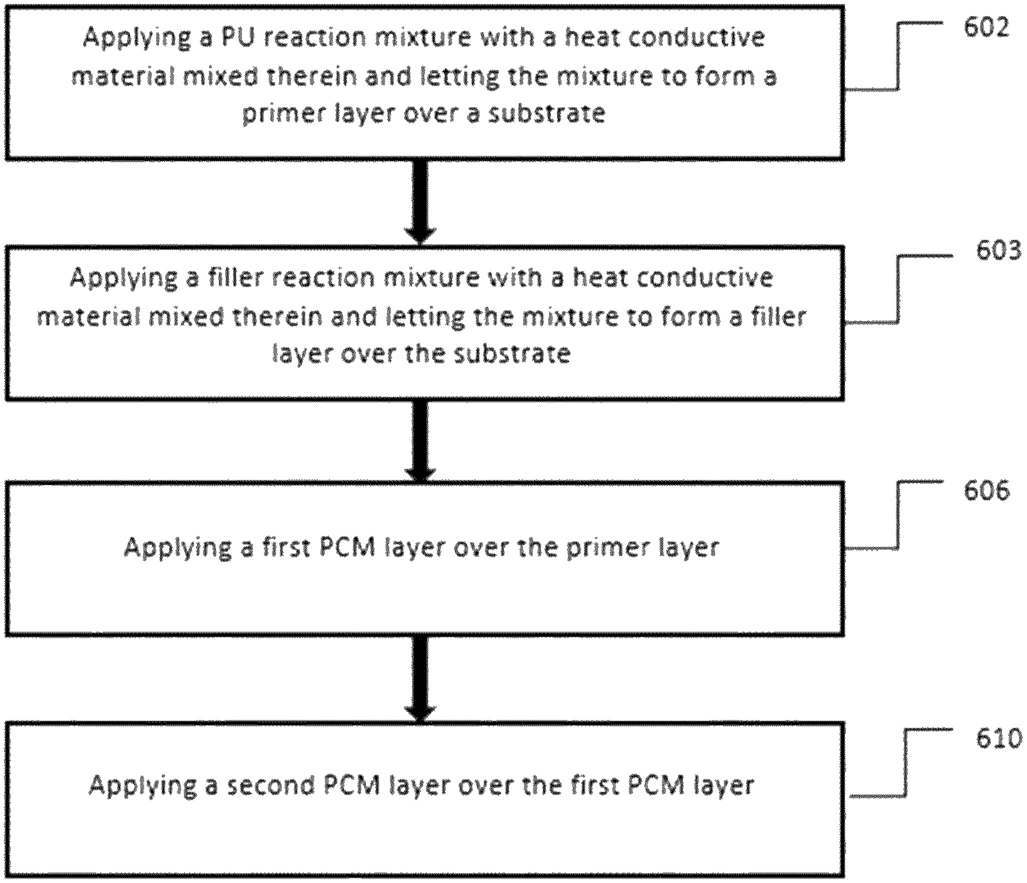

Referring to FIG. 8, another variation of the method of FIG. 6 for making the floor pavement structure 300 of FIG. 3 is illustrated. In this embodiment, in step 603 the filler mixture may be applied on the primer layer 108 that was applied earlier on the substrate 110 and has already hardened. Hence, in this embodiment of the method, once the primer layer 108 is formed in step 602, the next step is step 603 for forming the filler layer 109. For example, both a filler layer 109 and a primer layer 108 may be used when the substrate is concrete. In some embodiments, for an asphalt substrate the filler layer may be applied directly on the asphalt substrate. Each of the primer and the filler layers 108, 109 (see FIG. 3) may include a heat conductive material in an amount of 10% by weight on a dry basis. The applied filler mixture 109 is then allowed to harden before the first and second PCM layers are formed in steps 606 and 610 respectively.

Optionally, when the primer layer 108 has dried, silica sand or other forms of granules having the size of silica sand is applied on the primer layer for increasing the surface roughness of the primer layer.

Figure 9:
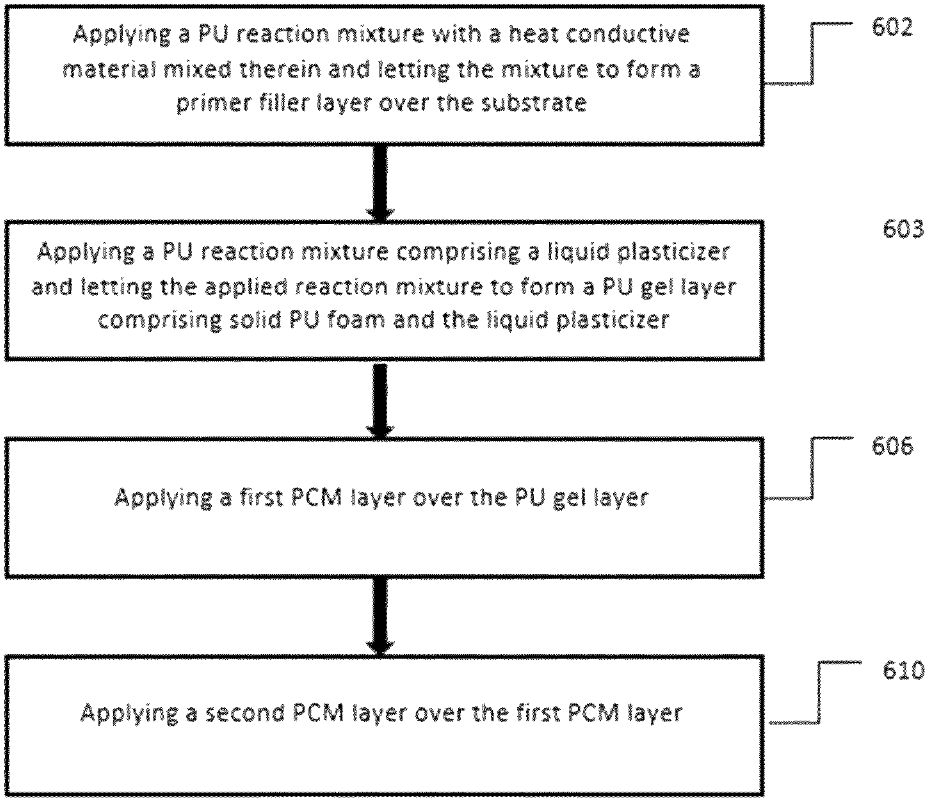

Referring now to FIG. 9, another variation of the method of FIG. 6 for making the floor pavement structure 400 of FIG. 4 is illustrated. In this embodiment, in step 604 a PU reaction mixture comprising a plasticizer is applied and allowed to harden on the primer layer 108 that has been formed before according to step 602. Then in steps 606 and 610 the first and second PCM layers are formed.

In some embodiments, the PCM may be formulated inside microcapsules and used as such by mixing inside the PCM layers material.

In some embodiments, the PCM microcapsules may be contained inside larger capsules, referred to as macrocapsules. Each macrocapsule may contain a plurality of microcapsules. The macrocapsules may be easier to process. Making the macrocapsules is disclosed in U.S. Pat. No. 6,835,334 to Davis et al. and includes providing a plurality of microcapsules comprising the PCM, and suspending the plurality of microcapsules in a gelling agent solution thereby forming a suspension of microcapsules in the gelling agent. The suspension is then added in a drop-wise manner within a crosslinking solution for crosslinking the gelling agent to form discrete macrocapsules. The formed macrocapsules are separated and dried to less than 1% moisture to produce the PCM macrocapsules. Any suitable gelling agents may be used including, for example, polysaccharides, nonionic polymers, inorganic polymers, polyanions and polycations.

Examples of polysaccharides include alginate and natural ionic polysaccharides such as chitosan, gellan gum, xanthan gum, hyaluronic acid, heparin, pectin and carrageenan. Examples of suitable ionically crosslinkable polyanions include polyacrylic acid and poly-methacrylic acid. Ionically crosslinkable polycations such as polyethylene imine and polylysine are also suitable. A specific example of a non-ionic polymer is polyvinylalcohol. Sodium silicates are examples of useful inorganic polymers. The crosslinking solution may typically comprise any suitable material capable of crosslinking the gelling agent to form a cross-linked gelling agent. Typical crosslinking materials include multivalent ions, in particular cations such as, for example, magnesium, calcium, zinc, barium, strontium, aluminum, iron, manganese, nickel, cobalt, copper, cadmium, lead, or mixtures of any 2 or more thereof. The crosslinking agent may be used in an amount sufficient to crosslink the gelling agent as is known in the art.

The macrocapsules may be mixed with a carrier material that forms the bulk of the PCM structure to form a PCM mixture and then the PCM mixture may be applied over the heat conductive sub-layer to form the PCM layers. For the two-layer PCM structure shown in FIGS. 1 and 2 the PCM mixture may be applied twice. The two-step application process for forming the first and second PCM layers is advantageous because it allows adding an effective amount of PCM and easier processing. It also allows changing the amount and type of PCM or PCMs as well the carrier material composition in each layer. For example, in making the first PCM layer 101 the carrier material may be formulated to provide a certain cushioning characteristic to the floor pavement structure 1, while in making the second PCM structure layer 102 the carrier material may be selected to provide a desired color and surface hardness to the floor coating.

Due to the coating thicknesses and application restraints, the macrocapsules may have a particle size in the range of 200 to 800 micrometers (μm), preferably 200 to 400 micrometers, and more preferably 200 to 400 micrometers. The macrocapsules may have a PCM content of at least 50% by weight, preferably at least 60% by weight, and more preferably 70% by weight.

The size of the microcapsules may range from 1 to 100 micrometers, preferably from 1 to 80 micrometers, more preferably 10 micrometers to 50 micrometers. The microcapsules may have a relatively high PCM amount, preferably at least 80% by weight.

Suitable PCMs may include paraffinic hydrocarbons having 13 to 28 carbon atoms. The melting point of a homologous series of paraffin hydrocarbons is directly related to the number of carbon atoms.

Other suitable PCMs may include crystalline materials such as 2,2-dimethyl-1,3-propanediol, 2-hydroxymethyl-2-methyl-1,3-propanediol, acids of straight or branched chain hydrocarbons such as eicosanoic acid and esters such as methyl palmitate, and fatty alcohols.

Other suitable PCMs include the following commercially available ones from Microtek Laboratories, Inc, under the tradename NEXTEK which are encapsulated PCMs in the form of white powder of mean particle size of 15 to 30 micrometers and the following melting points.

| TRADENAME | Melting Point |
|---|---|
| NEXTEK37 | 37° C. (±2° C.) |
| NEXTEK32 | 32° C. (±2° C.) |
| NEXTEK43 | 43° C. (±2° C.) |
| NEXTTEK6 | 6° C. (±2° C.) |
| NEXTTEK18 | 18° C. (±2° C.) |
| NEXTTEK24 | 24° C. (±2° C.) |
| NEXTTEK 37 | 37° C. (±2° C.) |
| NEXTTEK57 | 57° C. (±2° C.) |

Other suitable PCMs of paraffin wax base or hydrated salt base are available from Phase Change Material Product Ltd, a UK company under the tradename PLUSICE in the form of dry powder and various melting points.

EXAMPLES

Example 1

A floor pavement structure according to FIG. 4 with a concrete substrate comprised first and second PCM layers 101 and 102 having the same type and amounts of PCM (PCM_1, PCM_2) as per the following wet base compositions.

| First Top PCM layer composition (liquid state) | |
|---|---|
| Acrylic latex solution (dry matter: 60%) | 21% |
| Water | 19% |
| Chalk | 32% |
| Thickener (Xanthan Gum) | 17% |
| Further additives (fungicides, etc.) | 4% |
| PCM_1 | 7% |

| Second Top PCM layer composition (liquid state) | |
|---|---|
| Acrylic latex solution (dry matter: 60%) | 21% |
| Water | 19% |
| Chalk | 32% |
| Thickener (Xanthan Gum) | 17% |

-continued

| Second Top PCM layer composition (liquid state) | |
|---|---|
| Further additives (fungicides, etc.) | 4% |
| PCM_2 | 7% |

When the PCM layers are dried and the water has evaporated, the weight component of the PCM layers consisted of the filler material (chalk), the thickener, further additives and the PCM. The fraction of acrylic latex in the PCM layers was comparatively small.

The primer layer comprised about 60% of a PU prepolymer, about 22% of solvent naphtha (Mixtures of light aromatic hydrocarbons obtained from coal tar or petroleum), about 8% of propylene glycol methyl ether acetate (PGMEA, 1-methoxy-2-propanol acetate) (an adhesive), and about 10% graphite, wherein all percentages refer to weight percentages.

In a variation of example 1, for the primer layer a water based acrylic emulsion was used mixed in water with a composition comprising about 60% carboxylated styrolbutadiene resin, about 20% water, about 10% of propylene glycol methyl ether acetate and about 10% graphene, wherein all percentages refer to weight percentages.

In Example 1, the same PCM (referred to as PCM_1 and PCM_2) was used in the first and second PCM layers 101 and 102. The PCM comprised three PCM1, PCM2, and PCM3 as per the following table. The PCMs were selected to have staggered melting points in the desired range of from 24° C. to 37° C. The PCMs were encapsulated in macrocapsules having a size of 300 micrometers, each microcapsule comprising a plurality of microcapsules of the three PCMS. The three PCMs used and their melting point were as follows:

| PCM1 | PCM1 | PCM2 | PCM3 |
|---|---|---|---|
| TRADENAME | NEXTTEK24 | NEXTEK32 | NEXTEK37 |
| MELTING POINT (° C.) | 24 | 32 | 37 |

The barrier layer 103 had the following composition:

| Barrier layer composition (liquid state) | |
|---|---|
| Acrylic latex solution (dry matter: 60%) | 66% |
| Water | 22% |
| Ethylene glycol (compatibilizer) | 1% |
| Further additives (fungicides, etc.) | 11% |

The PU gel layer comprised a PU matrix and a plasticizer incorporated in the cells of the forming PU polymer matrix by whisking the liquid plasticizer into the polyurethane reaction mixture or into one of the components of the reaction mixture, e.g., the polyol component a polypropylene glycol having an average molecular weight ranging of about 3000. The PU formulation comprised an MDI based NCO terminal prepolymer, produced from an isomeric mixture of 2.4'; 4.4' and 2.2' MDI monomer based prepolymer with an NCO content of 10 weight % with 2.2 MDI of about 20 weight %. The process of making the PU gel layer is disclosed in EP3342930A1 of Advanced Polymer Technologies Corporation.

Example 2

In Example 2 the same PCM as in Example 1 was used but in different amounts in each of the first and second PCM layers. The same PCM cooling structure as in example 1 using the same three PCMs was applied on a concrete substrate but the total amount of the PCM_1 in the first and second PCM layers 101 and 102 was 7% by weight and 10% by weight, respectively, on a wet basis. An improvement in the cooling effect was observed.

Example 3

In Example 3 the same PCM cooling structure as in example 1 was applied on a concrete substrate but no graphite was added in the primer layer 108. A significant drop in the cooling effect was observed.

Example 4

In Example 4 the same PCM cooling structure as in FIG. 4 was used with the same PCM layers 101, 102 and primer layer 108 as in Example 1 but without a PU gel layer 106 or a barrier layer 108. Excellent cooling was observed.

Examples 5, 6 and 7

In Examples 5, 6 and 7 a floor pavement structure was formed as in example 1 except that in each of these examples a different combination of three PCMs were used as shown in the following table.

| | EX. 5 | EX. 6 | EX. 7 |
|---|---|---|---|
| PCM1 | NEXTTEK24 (MP: 24° C.) | NEXTTEK18 (MP: 18° C.) | PLUSICE S15 (MP: 15° C.) |
| PCM2 | NEXTTEK37 (MP: 37° C.) | NEXTTEK24 (MP: 24° C.) | PLUSICE S18 (MP: 18° C.) |
| PCM3 | NEXTTEK43 (MP: 43° C.) | NEXTTEK32 (MP: 32° C.) | PLUSICE S20 (MP: 20° C.) |

The PLUSICE S15, S18, and S20 are oleophilic paraffin hydrated salts commercially available from Change Material Product Ltd. Company.

To overcome processing issues, encapsulated PCMs with suitable melt points were selected which are in powder form of small, micron-size particles. Such encapsulated PCMs allow processing using existing dispersing techniques during the compounding and preparation of the various layer compositions.

Also, the application rate controlling the wet film thickness of the texturized water-based PCM layers (topcoats) is at least controlled (e.g., metered) by the particle size distribution of the aggregate materials used. Thus, the encapsulated PCM particle size was selected to prevent adverse changes to the application thickness of the PCM layers.

The above examples showed that the addition of the encapsulated PCM's into the topcoat, and addition of graphite/graphene into the primer layer requires no additional dispersion technology or processing change, beyond changes to the masterbatch (MB) thickener and colourant loadings, for rheology and colour adjustment, respectively. Also, no adverse effects were observed on interlayer or substrate adhesion.

Although the invention has been described in reference to specific embodiments, it should be understood that the invention is not limited to these examples only and that many variations of these embodiments may be readily envisioned by the skilled person after having read the present disclosure.

LIST OF REFERENCE NUMERALS

100, 200, 300, 400 and 500 floor pavement structure
101, 102 PCM layers
103 Barrier layer
106 PU Gel layer
108 Heat conductive sub-layer-primer layer
109 Heat conductive sub-layer-filler layer
212 PU matrix
214 Oil
302 structure layer
602 Step
603 Step
604 Step
606 Step
610 Step

What is claimed is:

1. A floor pavement structure comprising:
at least one phase change material (PCM) layer comprising at least one PCM in an effective amount to prevent overheating of the floor pavement structure, wherein the at least one PCM layer comprises a first PCM layer and a second PCM lavers. the second PCM layer being disposed on the first POM layer;
wherein the first POM layer comprises at least one first POM,
wherein the second PCM layer comprises at least one second PCM, and
wherein the second PCM layer is a top layer of the floor pavement structure.

2. The floor pavement structure of claim 1,
wherein the at least one first PCM and the at least one second PCM are dispersed within first and second acrylic materials, respectively.

3. The floor pavement structure of claim 1,
wherein the at least one first PCM and the at least one second PCM are paraffin-based materials comprising 50-65 wt % paraffin wax encapsulated inside microcapsules having a particle size of 15 to 30 micrometers.

4. The floor pavement structure of claim 1,
wherein the at least one first PCM and the at least one second PCM each comprise a PCM within a secondary supporting structure of hydrophilic silica powder that keeps the PCM solid in its macroscopic form.

5. The floor pavement structure of claim 1,
wherein the at least one first PCM and the at least one second PCM are paraffin-based materials comprising 50-65 wt % paraffin wax encapsulated inside microcapsules having a particle size of 15 to 30 micrometers, and
wherein the microcapsules are enclosed within macrocapsules each macrocapsule having a particle size of 200 to 800 micrometers and containing a plurality of the microcapsules.

6. The floor pavement structure of claim 1, further comprising a plurality of sub-layers comprising at least one heat conductive sub-layer comprising a heat conductive material,
wherein the plurality of sub-layers are disposed between the at least one PCM layer and a substrate,
wherein the heat conductive material comprises graphite, graphene or a combination thereof, and
wherein the heat conductive material is dispersed within a polyurethane (PU) or acrylic resin material.

7. The floor pavement structure of claim 4,
wherein the at least one first PCM and the at least one second PCM are same or different and have a melting point from 15° C. to 45° C., and
wherein an amount of the at least one first PCM in the first PCM layer is at least 5.0% less than an amount of the at least one second PCM in the second PCM layer.

8. The floor pavement structure of claim 7,
wherein the at least one heat conductive sub-layer includes a primer layer, or a filler layer, or a combination thereof,
wherein an amount of the graphene or the graphite or of the combination of the graphene and the graphite is from 6.0 to 24% by weight based on a total weight of the at least one heat conductive sub-layer,
wherein the at least one PCM layer comprises from 5.0 to 12.5% by weight based on a total weight of the at least one PCM layer,
wherein the top layer has a height of 200 μm to 800 μm, and
wherein the at least one heat conductive sub-layer has a height of 5 μm-500 μm.

9. The floor pavement structure of claim 6,
wherein the graphene or graphite or the combination of graphene and graphite in the at least one heat conductive sub-layer is from 9.5 to 10.5% by weight based on a total weight of the at least one heat conductive sub-layer, and
wherein the at least one PCM in the at least one PCM layer is from 6.5 to 7.5% by weight based on a total weight of the at least one PCM layer.

10. The floor pavement structure of claim 6,
wherein the plurality of sub-layers further comprise a polyurethane (PU) gel layer, and a barrier layer,
wherein the PU gel layer comprises a solid polyurethane polymer matrix and a liquid plasticizer, the liquid plasticizer being a vegetable oil or a derivative of vegetable oil or a mixture of the vegetable oil and the derivative of vegetable oil,
wherein the barrier layer is disposed between the PU gel layer and the at least one PCM layer,
wherein a structure layer is disposed between the at least one heat conductive sub-layer and the at least one PCM layer, and
wherein the PU gel layer is disposed between the at least one heat conductive sub-layer and the at least one PCM layer.

11. The floor pavement structure of claim 10,
wherein there is no PCM in any of the plurality of sub-layers,
wherein the substrate comprises concrete, asphalt, sand, stone, wood, or clay,
wherein the barrier layer has a height of 5 μm-300 μm; and
the PU gel layer has a height of 1 mm-4 mm.

12. The floor pavement structure of claim 6,
wherein the plurality of sub-layers further comprises a polyurethane (PU) gel layer, a barrier layer, and a structure layer,
wherein the PU gel layer comprises a solid polyurethane polymer matrix and a liquid plasticizer, the liquid plasticizer being a vegetable oil or a derivative of vegetable oil or a mixture of a vegetable oil and a derivative of vegetable oil,
wherein the barrier layer is disposed between the PU gel layer and the at least one PCM layer,
wherein the structure layer is disposed between the at least one heat conductive sub-layer and the at least one PCM layer, and wherein the PU gel layer is disposed between the at least one heat conductive sub-layer and the at least one PCM.

13. The floor pavement structure of claim 6, wherein the at least one first PCM and the at least one second PCMs are same or different and have a melting point from preferably 25° C. to 40° C., and wherein an amount of the first PCM in the first PCM layer is 10 to 30%, less than an amount of the second PCM in the second PCM layer.

14. The floor pavement structure of claim 13, wherein the graphite is a nano-graphite composite with a content of nano-graphite ranging 8.0 to 12.0% by weight based on a total weight of the heat conductive sub-layer.

15. A floor pavement structure comprising:

at least one phase change material (PCM) layer comprising at least one PCM in an effective amount to prevent overheating of the floor pavement structure, a plurality of sub-layers comprising at least one heat conductive sub-layer comprising a heat conductive material, wherein the plurality of sub-layers are disposed between the at least one PCM and a substrate, wherein the heat conductive material comprises graphite, graphene or a combination thereof, and wherein the heat conductive material is dispersed within a polyurethane (PU) or acrylic resin material wherein the graphite is nano-graphite with a content of the nano-graphite ranging from 5.0 to 15.0% by weight based on a total weight of the at least one heat conductive sub-layer.

16. A method of constructing a floor pavement structure, the method comprising:

forming at least one PCM layer over at least one sub-layer, the at least one PCM layer containing at least one PCM in an effective amount to prevent overheating of the floor pavement structure;

forming a second PCM layer over the a first PCM layer of the at least one PCM layer, wherein the second PCM layer is a top layer of the floor pavement structure.

17. The method of claim 16, further comprising:

before forming the first PCM layer forming the at least one sub-layer over a substrate by applying a first reaction mixture comprising a heat conductive material dispersed therein on top of the substrate and letting the applied reaction mixture to form the at least one sub-layer;

wherein the heat conductive material comprises graphite, graphene or a combination thereof, wherein the first reaction mixture is a PU reaction mixture and the at least one sub-layer is a primer or a filler layer;

wherein the forming of the first PCM layer includes applying a first acrylic emulsion containing the at least one first PCM and letting the applied first acrylic emulsion to form the first PCM layer over the at least one sub-layer; and wherein the forming of the second PCM layer (610) includes applying a second acrylic emulsion containing the at least one second PCM and letting the applied second acrylic emulsion to form the second PCM layer over the first PCM layer.

18. The method of claim 17, further comprising, after the at least one sub-layer is formed and before forming the first PCM layer, applying a reaction mixture of a PU matrix and a liquid plasticizer on the at least one sub-layer and letting a PU gel layer form with the plasticizer within the PU gel layer, and after the forming of the PU gel layer is completed, applying a barrier layer on top of the PU gel layer;

wherein the first PCM layer is applied on the barrier layer.

* * * * *